United States Patent
Eder et al.

(10) Patent No.: US 9,025,472 B2
(45) Date of Patent: May 5, 2015

(54) TECHNIQUE FOR RADIO RESOURCE MANAGEMENT

(75) Inventors: Franz Eder, Burgthann (DE); Stefan Mueller-Weinfurtner, Nürnberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 573 days.

(21) Appl. No.: 12/994,493

(22) PCT Filed: May 20, 2009

(86) PCT No.: PCT/EP2009/056161
§ 371 (c)(1),
(2), (4) Date: Nov. 24, 2010

(87) PCT Pub. No.: WO2009/144165
PCT Pub. Date: Dec. 3, 2009

(65) Prior Publication Data

US 2011/0069631 A1    Mar. 24, 2011

Related U.S. Application Data

(60) Provisional application No. 61/056,501, filed on May 28, 2008.

(30) Foreign Application Priority Data

May 27, 2008    (EP) .................................... 08009653

(51) Int. Cl.
H04W 72/14    (2009.01)
H04L 1/16    (2006.01)

(52) U.S. Cl.
CPC ............. *H04W 72/14* (2013.01); *H04L 1/1692* (2013.01)

(58) Field of Classification Search
None
See application file for complete search history.

(56) References Cited

U.S. PATENT DOCUMENTS

| 2004/0160914 | A1 | 8/2004 | Sarkar |
| 2006/0221923 | A1 | 10/2006 | Usuda et al. |
| 2007/0054652 | A1 | 3/2007 | Pan et al. |
| 2007/0183390 | A1* | 8/2007 | Sipila et al. ................... 370/350 |
| 2008/0200138 | A1* | 8/2008 | Sipila ......................... 455/226.2 |

FOREIGN PATENT DOCUMENTS

| CN | 1983849 A | 6/2007 |
| EP | 1737262 A1 | 12/2006 |
| EP | 1758263 A2 | 2/2007 |
| EP | 1860910 A1 | 11/2007 |
| JP | 2007060597 A | 3/2007 |

(Continued)

*Primary Examiner* — Jackie Zuniga Abad

(74) *Attorney, Agent, or Firm* — Coats & Bennett, PLLC

(57) ABSTRACT

A technique for radio resource management is proposed for controlling a wireless transceiver in a cellular communication system that comprises a scheduling channel configured to transport relative scheduling grants for signalling adjustments in transmission resources previously granted to the wireless transceiver. A method embodiment of this technique comprises the steps of deriving an amplitude parameter indicative of an instantaneous amplitude level of the scheduling channel, determining a threshold value taking into account the amplitude parameter, processing a scheduling signal received over the scheduling channel to obtain a signal sample comprising a relative scheduling grant, and subjecting the signal sample to a threshold decision based on the threshold value to decode the relative scheduling grant.

23 Claims, 3 Drawing Sheets

(56) References Cited

FOREIGN PATENT DOCUMENTS

| WO | 2005/018270 | A2 | 2/2005 |
|---|---|---|---|
| WO | 2006077141 | A1 | 7/2006 |
| WO | 2007/044414 | A1 | 4/2007 |
| WO | 2007073330 | A2 | 6/2007 |

* cited by examiner

TECHNIQUE FOR RADIO RESOURCE MANAGEMENT

TECHNICAL FIELD

The present invention generally relates to radio resource management in a cellular communication system. In particular, the invention relates to a radio resource management technique that utilises one or more scheduling channels.

BACKGROUND

Radio resource management techniques are employed to utilise the limited radio spectrum resources and radio network infrastructure as efficiently as possible. Modern cellular communications systems such as wideband code division multiple access (WCDMA) systems implement a plurality of such techniques.

FIG. 1 shows an illustration of an exemplary WCDMA system architecture 10 including a core network 12, a radio access network (RAN) 14 and a plurality of user terminals 16, also referred to as user equipment (UE). The RAN includes one or more components 18 responsible for radio network control (RNC) and one or more base station components 20, also referred to as "Node B", that mainly perform air interface processing. Each base station component 20 serves one or more network cells. One RNC component 18 and one or more associated base station components 20 constitute a radio network subsystem (RNS). A RAN typically comprises a plurality of such RNSs.

Enhancements in the uplink direction of WCDMA are currently being standardised within the 3rd generation partnership project (3GPP). Among the various standardized features are fast scheduling and fast hybrid automatic repeat request (HARQ) as described in the 3GPP document TS 25.309 "FDD Enhanced Uplink". Conventional radio resource management techniques include control features such as admission and congestion control (ACC), radio link control (RLC), and outer loop power control (OLPC). As shown in FIG. 1, these features are conventionally located in the RNC component 18. On the other hand, the new control features introduced for enhancing the uplink direction, such as fast uplink scheduling and fast HARQ, are primarily located in the base station components 20.

The document TS 25.309 not only describes new control features, but also new uplink channels. In addition to conventional uplink channels such as the dedicated physical data channel (DPDCH) and the (high speed) dedicated physical control channel ((HS-) DPCCH), an enhanced DPDCH (E-DPDCH) and an enhanced DPCCH (E-DPCCH) are introduced. The DPCCH carries pilot symbols and portions of the outband control signalling. Remaining outband control signalling for implementing the enhancements in the uplink direction is carried on the E-DPCCH, while the E-DPDCH carries the data transmitted using the enhanced uplink features. According to TS 25.309, the term E-DCH generally denotes a new dedicated transport channel type or enhancements to an existing dedicated transport channel type.

In the following, the radio resource management technique of fast uplink scheduling will be discussed in more detail. Generally, fast scheduling as used in the uplink context here denotes the possibility for a base station component 20 to control when a user terminal 16 is transmitting and, in combination with adaptive modulation and coding (AMC), at which data rate.

Using the fast scheduling feature, the base station component 20 sends a resource indication ("scheduling grant") in the downlink to the user terminal 16. The scheduling grant indicates to the user terminal the maximum amount of uplink resources the user terminal is allowed to use. The scheduling grants are used in connection with the E-DCH transport format combination (TFC) selection and control the maximum allowed E-DPDCH/DPCCH power ratio. In general, the scheduling grants set an upper limit on the data rate a particular user terminal may use. However, the power situation in a particular user terminal, as well as activity on other, non-scheduled channels, may lead to the situation that the user terminal transmits with a lower data rate on the E-DCH than that granted by means of the scheduling grants.

The scheduling grants can be divided into absolute grants on the one hand and into relative grants on the other. By using these two types of grants, the scheduling base station components can sophistically control the transmission behaviour of each individual user terminal.

Absolute grants are used to set an absolute limitation (typically in terms of power ratio relative DPCCH) for the maximum amount of uplink resources that may be used on the E-DCH for data transmission. The maximum amount of uplink resources allowed for E-DCH data transmission determines the maximum data rate on E-DCH. Typically, absolute grants are used for significant but infrequent changes of the resource allocation for a particular user terminal (e.g., at times of bearer setup or when granting resources in response to a scheduling request received from a user terminal).

Absolute grants are sent by the E-DCH cell serving a particular user terminal and transmitted on a control channel called E-AGCH (E-DCH absolute grant channel) that can be shared by multiple user terminals. Generally, there is only a single E-AGCH for all user terminals that are served by a particular cell.

Relative grants, on the other hand, are used to update the resource allocation for a particular terminal. Relative grants can be sent by serving as well as non-serving base station components and typically as a complement to absolute grants. A relative grant from a serving cell can take one of three different signalling contents, namely either "up", "down" or "hold". A relative grant from a non-serving cell can take one of two different values, "down" or "hold". These signalling contents refer to uplink resource limitations associated with a user terminal relative to the amount of resource the user terminal is currently using.

Relative grants are transmitted on individual control channels, namely on E-DCH relative grant channels (E-RGCHs). FIG. 3 shows a schematic illustration of E-RGCH and E-AGCH signalling. There is one E-RGCH per user terminal from the serving cell, and each user terminal may receive one relative grant per transmission time interval (TTI). Thus, the relative grants have some similarities with power control instructions.

In a soft handover scenario, in which a user terminal is communicating with a plurality of cells, the user terminal receives absolute grants only from a single one of these cells, namely from the serving E-DCH cell (or simply serving cell). The serving cell has therefore the main responsibility for the scheduling operation. However, also non-serving cells involved in a soft handover with a particular user terminal are able to influence the resource consumption of this user terminal in order to control the overall interference level within their own cell coverage. In this context, a particular user terminal may receive relative grants from both the serving cells and all non-serving cells involved in a soft handover with the particular user terminal.

A serving E-DCH radio link set (or simply serving RLS) denotes the set of cells which contains at least the serving cell and from which the user terminal can receive relative grants and absolute grants. Each user terminal has only one serving RLS. A non-serving E-DCH RLS (or simply non-serving RLS) denotes the set of cells which does not contain the serving cell and from which the user terminal can receive absolute grants. A user terminal may have zero, one or several non-serving RLSs.

Base station components of the non-serving RLS will only send relative grants to the user terminal. The relative grants from such base station components are restricted to the values "down" and "hold". In the absence of a "down" from any non-serving RLS, the user terminal simply follows the scheduling grants of the serving RLS.

If a user terminal is receiving a "down" from any non-serving cell, this is an indication that the cell in question is overloaded and the user terminal shall therefore reduce its data rate compared to the data rate it is currently using (even if one or more grants from the serving cell suggest an increase). Thus, the relative grant from a non-serving cell serves as an overload indicator. The overload indicator is sent to all user terminals for which the overloaded cell is a non-serving cell as shown FIG. 3.

The challenge on the side of the user terminals in context with decoding the (serving or non-serving) E-RGCH is that the relative grants are multi-valued ("up", "down", "hold"), and that most of the time a "hold" will be signalled. Signalling a "hold" basically means that the transmitted amplitude level on the E-RGCH is zero.

A possible approach for decoding the E-RGCH might be to determine a threshold $\tau_{E-RGCH} > 0$ and to decide for "down" if $\gamma_{E-RGCH} < -\tau_{E-RGCH}$ (with $\gamma_{E-RGCH}$ being the demodulated sample value for the E-RGCH), "up" if $\gamma_{E-RGCH} > \tau_{E-RGCH}$, and "hold" otherwise.

$\tau_{E-RGCH}$ may be fixedly determined based on a noise variance estimate and may be selected to realize a fixed probability of, for example, 0.1 for missing a "hold". Accordingly, the probability of missing either a "up" or a "down" is 0.05 in each case. In situations of good channel conditions, for example in cases of increased E-RGCH power, it would be possible to have both a lower probability for a missed "hold" and a lower probability for a missed "up"/"down". However, such situations are difficult to exploit because the E-RGCH power offset relative to, for example, the common pilot channel (CPICH) is not signalled. Moreover, it is expected that the base station components will signal "hold" most of the time, which makes it difficult to estimate the power on the E-RGCH in a simple manner.

SUMMARY

Accordingly, there is a need for a more efficient technique for decoding relative scheduling grants.

According to a first aspect, this need is satisfied by a method of controlling a wireless transceiver in a cellular communication system, the wireless transceiver listening to a scheduling channel configured to transport relative scheduling grants, the relative scheduling grants signalling adjustments in transmission resources granted to the wireless transceiver, wherein the method comprises deriving an amplitude parameter indicative of an instantaneous amplitude level of the scheduling channel, determining a threshold value taking into account the amplitude parameter, processing a scheduling signal received over the scheduling channel to obtain a signal sample comprising a relative scheduling grant, and subjecting the signal sample to a threshold decision based on the threshold value to decode the relative scheduling grant.

The threshold value may be repeatedly re-determined (or guided) to take into account amplitude parameter variations associated with amplitude level variations of the scheduling channel. In other words, the threshold value may be adapted in accordance with the (e.g. estimated) instantaneous amplitude level of the scheduling channel to improve the reliability of the decoding operation.

In one implementation, the amplitude parameter indicative of the instantaneous amplitude level of the scheduling channel is derived from a signal received over at least one further channel extending in parallel to the scheduling channel. That is, the instantaneous amplitude level of the scheduling channel may be estimated from the instantaneous amplitude level of a parallel channel experiencing the same channel impairments. Such channel impairments may include interference, fading, and the like.

According to a first variant, the at least one further channel is an ARQ indicator channel, and the amplitude parameter is derived from an indicator signal received over the ARQ indicator channel. The ARQ indicator channel may, for example, be the E-DCH HARQ Acknowledgement Indicator channel (E-HICH). The E-HICH is a fixed rate dedicated downlink physical channel carrying the uplink E-DCH HARQ Acknowledgement Indicator. Such an indicator may include an acknowledgement (ACK) or an explicit indication of a denied acknowledgement (NACK). Accordingly, the threshold value may be guided in accordance with an observation of the instantaneous ACK/NACK amplitude on the E-HICH. This approach is based on the reasonable assumption that the scheduling channel and the indicator channel are being transmitted at approximately the same power level and are experiencing similar channel conditions.

In one specific example, the threshold value may be defined as $$\tau_a = |\gamma_{E-HICH}|/k, \quad (1)$$

with $\gamma_{E-HICH}$ being a sample value indicative of an instantaneous amplitude level of the ARQ indicator channel and k being a system parameter. The (fixed or variable) system parameter k can be selected to equal 2 or any other value depending on the prevailing requirements and conditions.

According to a second variant, the at least one further channel is a pilot channel, so that the amplitude parameter can be derived from a pilot signal received over the pilot channel. Accordingly, the threshold value may be guided in accordance with an estimation of the amplitude ratio between the scheduling channel (for sample values not indicative of a "hold") on the one hand and the pilot channel on the other. The pilot channel may be the CPICH or any other pilot channel.

In the second variant, the threshold value may be calculated taking into account a long-term amplitude average λ of $|\gamma_{E-RGCH}|/\gamma_{CPICH}$, with $\gamma_{E-RGCH}$ and $\gamma_{CPICH} > 0$ being sample values indicative of an instantaneous amplitude level of the scheduling channel and the pilot channel, respectively. During the averaging process, only sample values of $\gamma_{E-RGCH}$ not indicative of a "hold" may be taken into account.

In one specific example, the threshold value can be defined as $$\tau_a = \lambda \cdot \gamma_{CPICH}/l, \quad (2)$$

with l being a system parameter. The (fixed or variable) system parameter/may be selected to equal 2 or any other value depending on the prevailing conditions and requirements.

The first variant and the second variant discussed above may be combined in various ways. For example, a decision of whether or not a sample value of $\gamma_{E-RGCH}$ is indicative of a "hold" may at least initially be based on the amplitude parameter derived from an indicator signal received over the ARQ indicator channel.

According to one implementation, the method may further comprise the steps of comparing the threshold value determined from the amplitude parameter with a predefined threshold value, and of performing the threshold decision based on the predefined threshold value in the case the determined threshold value does not exceed the predefined threshold value. The predefined threshold value may be a conventional threshold value that may have been calculated based on a noise variance estimate as is known in the art. In another implementation, the method may further comprise performing the threshold decision based on the predefined threshold value in the case no or no reliable amplitude parameter is available for determining an instantaneous threshold value.

The steps of deriving an amplitude parameter and of determining the threshold value may be performed with a predefined periodicity to guide the determined threshold value in accordance with the (e.g., estimated) amplitude level of the scheduling channel. When the scheduling channel is structured into radio frames comprising subframes, the periodicity may be set to a value between a subframe duration and a radio frame duration. For example, the periodicity may be set to a value between 2 ms (a typical subframe duration) and 10 ms (a typical radio frame duration).

The invention can be practised in the form of one or more pieces of hardware, as a software solution, or as a combination thereof. As for a software solution, a computer program product comprising program code portions for performing the steps disclosed herein when the computer program product is run on one or more computing devices is provided. The computer program product may be stored on a computer-readable recording medium.

As for a hardware aspect, a wireless transceiver configured to be controlled over a scheduling channel in a cellular communication system is provided, wherein the scheduling channel is configured to transport relative scheduling grants that signal adjustments in transmission resources granted to the wireless transceiver. The wireless transceiver comprises a first processing module adapted to derive an amplitude parameter indicative of an instantaneous amplitude level of the scheduling channel, a second processing module adapted to determine a threshold value taking into account the amplitude parameter, a third processing module adapted to process a scheduling signal received over the scheduling channel to obtain a signal sample comprising a relative scheduling grant, and a fourth processing module adapted to subject the signal sample to a threshold decision based on the threshold value to decode the relative scheduling grant.

The first processing module may be adapted to derive the amplitude parameter indicative of the instantaneous amplitude level of the scheduling channel from a signal received over at least one further channel extending in parallel to the scheduling channel. The at least one further channel may comprise at least one of an ARQ indicator channel and of a pilot channel, and the amplitude parameter may be derived from at least one of an indicator signal received over the ARQ indicator channel and a pilot signal received over the pilot channel.

The at least one wireless transceiver may be part of a user terminal, such as a mobile telephone, a personal digital assistant (PDA) of a data or network card, or of any other device.

BRIEF DESCRIPTION OF THE DRAWINGS

In the following, the invention will be described with reference to exemplary embodiments illustrated in the drawings, wherein.

DETAILED DESCRIPTION OF THE PREFERRED EMBODIMENTS

In the following description, for purposes of explanation and not limitation, specific details are set forth, such as particular sequences of steps, signalling sequences and device configurations in order to provide a thorough understanding of the present invention. It will be apparent to one skilled in the art that the present invention may be practised in other embodiments that depart from these specific details. In particular, while the embodiments will be described below in a WCDMA context and with respect to a specific 3GGP scheduling scheme, it is to be understood that the invention can also be implemented in context with other telecommunication standards, such as CDMA2000, and other scheduling mechanisms.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 1:
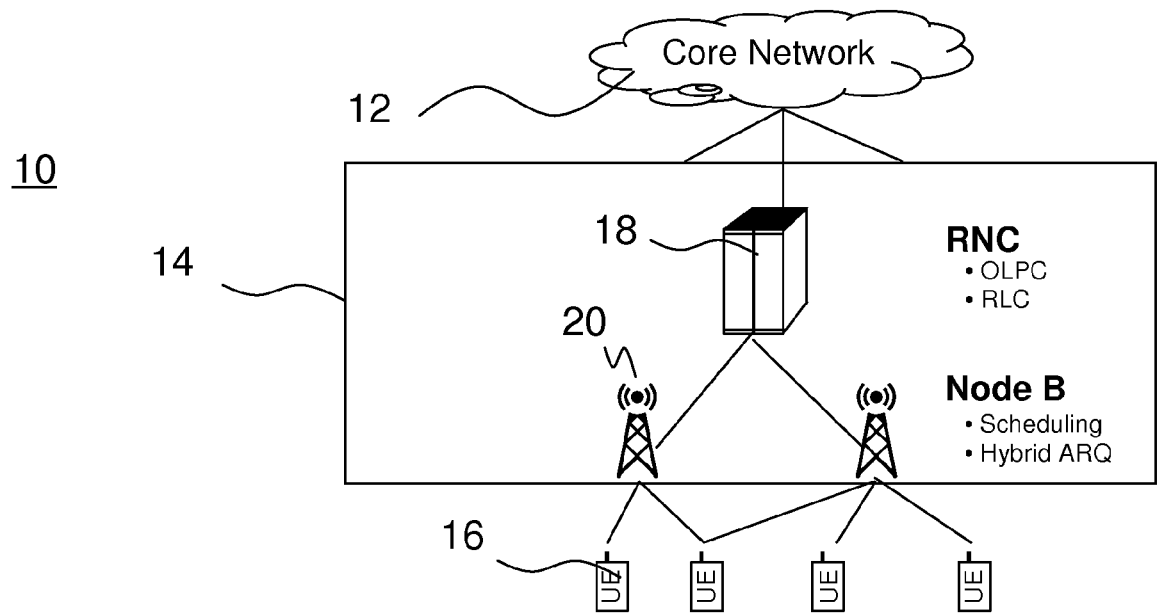
FIG. 1 is a schematic illustration of a WCDMA architecture in which the present invention can be practised.
Figure 2:
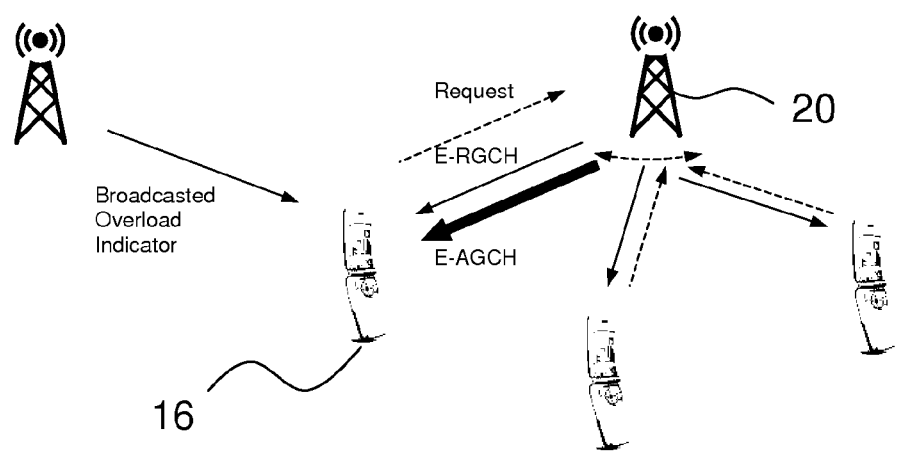
FIG. 2 is a schematic diagram illustrating radio resource management signalling.
Figure 3:
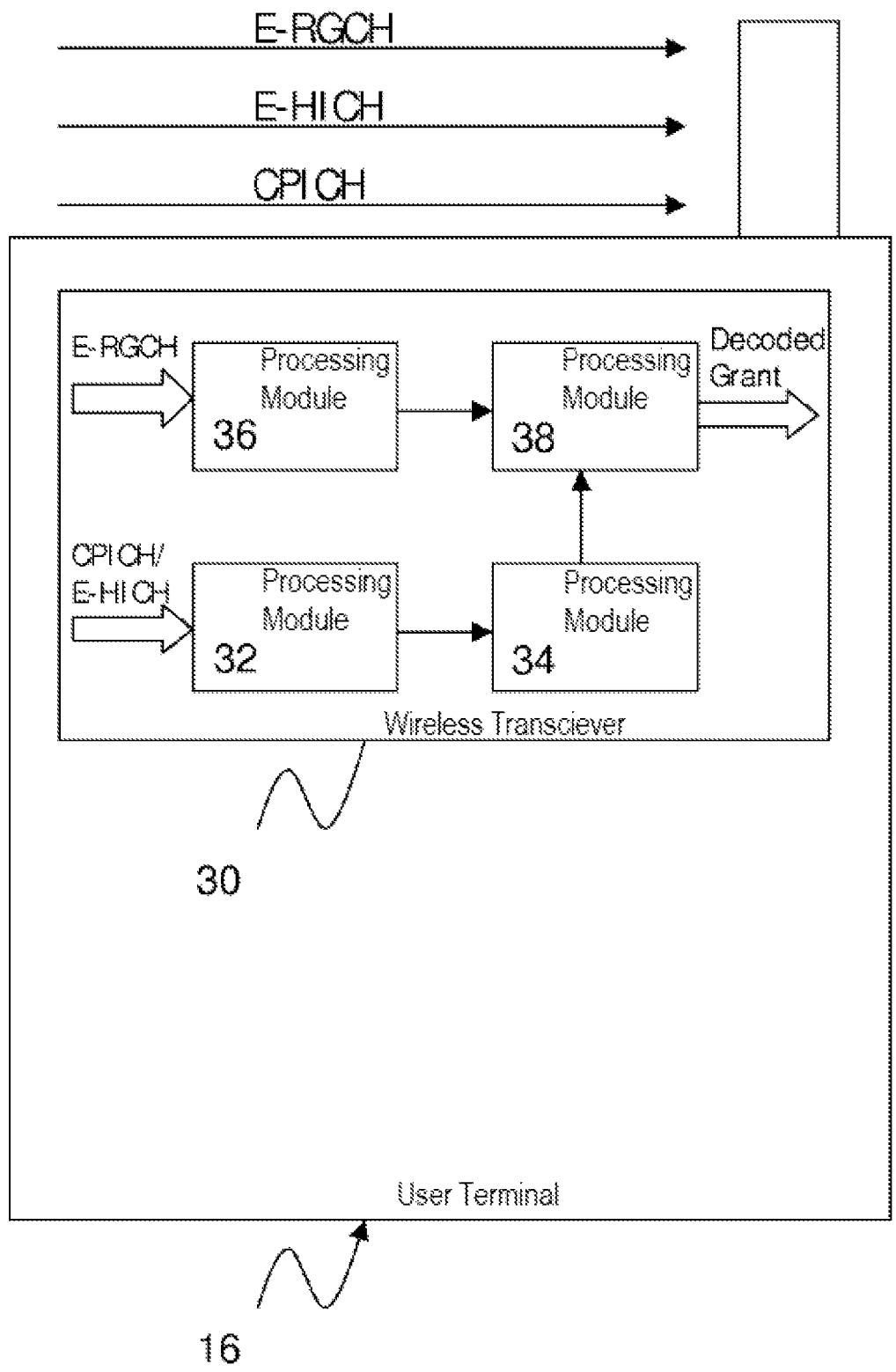
FIG. 3 is a schematic diagram illustrating an embodiment of a wireless transceiver.

FIG. 3 schematically shows a user terminal 16 that can be used in a cellular communication system as illustrated in FIG. 1 for a more sophisticated radio resource management. The user terminal 16 comprises an embodiment of a wireless transceiver 30 configured to receive the E-RGCH and at least one of the E-HICH and the CPICH. The E-HICH and CPICH extend in parallel to the E-RGCH and experience the same channel impairments as the E-RGCH.

The wireless transceiver comprises a plurality of processing modules 32, 34, 36, 38. The first processing module 32 is adapted to derive an amplitude parameter indicative of an instantaneous amplitude level of the E-RGCH. The amplitude parameter is in the present embodiment derived from a signal received over at least one of the E-HICH and the CPICH. The second processing module 34 is adapted to determine a threshold value taking into account the amplitude parameter derived by the first processing module 32.

The third processing module 36 is adapted to operate independently from the first and second processing modules 32, 34 and to process a scheduling signal received over the E-RGCH to obtain a signal sample comprising a relative scheduling grant. The relative scheduling grant will typically be a "up", "down" or "hold" instruction.

The fourth processing module 38 is coupled to the second and third processing modules 34, 36 and adapted to subject the signal sample obtained by the third processing module 36 to a threshold decision based on the threshold value determined by the second processing module 34. The threshold decision will result in a decoding of the relative scheduling grant as indicated in FIG. 3.

Figure 4:
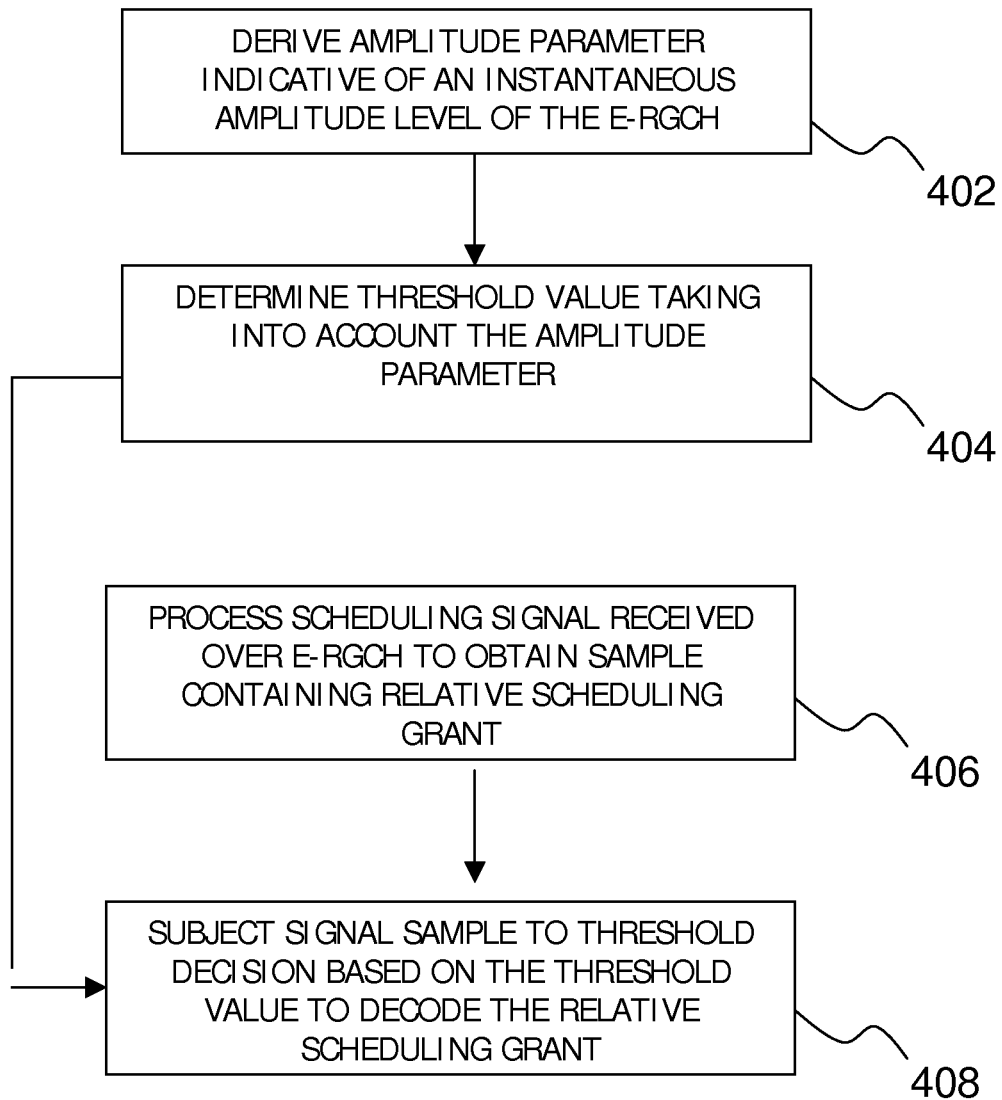
FIG. 4 is a schematic flow diagram illustrating a method embodiment.

The operation of the transceiver 30 will now be described in more detail with reference to the flow chart 400 illustrated in FIG. 4.

In step 402, the first processing module 32 of the transceiver 30 derives an amplitude parameter indicative of an instantaneous amplitude level of the E-RGCH. This amplitude parameter is not determined based on a signal received on the E-RGCH, but based on a signal received on at least one of the CPICH and the E-HICH. In other words, it is assumed here that the instantaneous CPICH and E-HICH amplitude levels permit an estimation of the instantaneous E-RGCH amplitude level.

In a next step 404, the second processing module 34 calculates a threshold value taking into account the amplitude parameter derived by the first processing module 32 in step 402. In the present embodiment, the "actual" threshold value $\tilde{\tau}_{E\text{-}RGCH}$ output by step 404 is derived from an "instantaneous" threshold value $\tau_a$ (which was calculated from the amplitude parameter derived in step 402) and from a "predefined" threshold value $\tau_{E\text{-}RGCH}$ (which can be conventionally derived based on a noise variance estimate) as follows:

$$\tilde{\tau}_{E\text{-}RGCH} := \begin{cases} \tau_{E\text{-}RGCH} & \text{if } \tau_a \leq \tau_{E\text{-}RGCH}, \\ \tau_a & \text{otherwise.} \end{cases} \quad (3)$$

This means that if the "instantaneous" threshold value $\tau_a$ does not exceed the "predefined" threshold value $\tau_{E\text{-}RGCH}$, the "predefined" threshold value $\tau_{E\text{-}RGCH}$ is selected as the "actual" threshold value $\tilde{\tau}_{E\text{-}RGCH}$ so as to provide a "safety margin". By doing so, there is no impact of a DTX (corresponding to an amplitude level of zero) on the (serving) E-HICH or of very bad channel conditions on the decoding result. If, on the other hand, the "instantaneous" threshold value $\tau_a$ should exceed the "predefined" threshold value $\tau_{E\text{-}RGCH}$, then the "instantaneous" threshold value $\tau_a$ is selected as the "actual" threshold value $\tilde{\tau}_{E\text{-}RGCH}$. By using the instantaneous" threshold value $\tau_a$ as the "actual" threshold value $\tilde{\tau}_{E\text{-}RGCH}$, an amplitude level-guided threshold decision can be implemented.

Steps 402 and 404 may be continuously repeated so as to always provide a current threshold value $\tilde{\tau}_{E\text{-}RGCH}$ that is guided in accordance with the prevailing channel conditions. The periodicity of steps 402 and 404 may be in the second or millisecond regime and will typically range between the duration of a radio frame and the duration of a subframe. As such, the periodicity may be set to somewhere between 2 and 10 ms.

Independently from deriving the amplitude parameter in step 402 and from determining the threshold value in step 404, a scheduling signal continuously received over the E-RGCH is processed in step 406. During the processing in step 406, a signal sample containing at least one (and preferably exactly one) relative scheduling grant is obtained.

Then, in a further step 408, the signal sample obtained in 406 is subjected to a threshold decision based on the current threshold value delivered from step 404 to decode the relative scheduling grant. The threshold decision underlying the decoding operation in step 408 could be implemented as follows. If $\gamma_{E\text{-}RGCH} < -\tilde{\tau}_{E\text{-}RGCH}$, a "down" will be the decoding result (with $\gamma_{E\text{-}RGCH}$ being again the demodulated sample value for the E-RGCH). On the other hand, if $\gamma_{E\text{-}RGCH} > \tilde{\tau}_{E\text{-}RGCH}$, an "up" will be the decoding result. Otherwise, a "hold" will be the decoding result.

The decoding result generated in step 408 is passed on to another functional module of the transceiver 30 to control the transmission behaviour of the transceiver 30 responsive to the decoded relative scheduling grant, In the following, two different variants for determining the parameter $\tau_a$ will be described in more detail. The first variant is based on the E-HICH, and the second variant is based on the CPICH. Both variants can be combined as needed.

The basic assumption underlying the first variant is that the E-RGCH is always transmitted with greater or equal power than the E-HICH. This assumption is generally justified because the network is interested that both channels can be decoded by the user terminal, and the E-RGCH is less robust than the E-HICH. It should be noted that both channels have the same time alignment, and the only parameter that differs is the signature sequence.

Under this assumption, one can use the E-HICH as a guiding channel for the E-RGCH amplitude level estimation, as the E-HICH is never switched off while E-DCH is active. It should be noted that in discontinuous transmission (DTX) scenarios the E-HICH may temporarily not be transmitted. In such a DTX situation, the above approach of using a "predefined" threshold value $\tau_{E\text{-}RGCH}$ as illustrated in the above formula (3) may be useful.

Let $\gamma_{E\text{-}HICH}$ and $\gamma_{E\text{-}RGCH}$ be the sample values after correlation for E-HICH and E-RGCH, respectively. If the above assumption is true, one could expect $|\gamma_{E\text{-}HICH}| \approx |\gamma_{E\text{-}RGCH}|$ in case of "up" or "down" on the E-RGCH in sufficiently good channel conditions.

As such, the parameter $\tau_a$ can be defined as:

$$\tau_a = |\gamma_{E\text{-}HICH}|/k \quad (4)$$

The parameter k is a system parameter. According to a first option, this system parameter k is set to a fixed, predefined value such as 2 or any value close to 2. According to another option, the system parameter k is adjustable responsive to the prevailing conditions and requirements.

Possible improvements of this approach of determining the parameter $\tau_a$ include the following. First, the parameter $\tau_a$ could be derived from $|\gamma_{E\text{-}HICH}|$ in a way that the missed "hold" probability is twice the missed "up" probability, and the missed "up" probability equals the missed "down" probability. An alternative approach could be the following. If a missed "hold" probability <10% and a missed "up"/"down" probability=5% are not possible, then one may design for a missed "hold" probability of 10% and make the missed "up"/"down" probability as low as possible. Otherwise, one may design for a missed "up"/"down" probability equal to 5% and make the missed "hold" probability as low as possible (<10%). The desired probabilities may be implemented by adjusting the system parameter k in the above formula (4) as required.

Now a second variant for determining the parameter $\tau_a$ will be described in more detail. The second variant is based on the CPICH.

Let $\gamma_{CPICH} > 0$ be the equivalent instantaneous amplitude level of CPICH transformed into the E-RGCH correlation domain. The transformation is required in the case the spreading factor for the CPICH is different from the spreading factor for the E-RGCH. In a typical scenario with a spreading factor of 256 for the CPICH and a spreading factor of 128 for the ERGCH an amplitude transformation by a factor of two will thus be performed.

In the case that the E-RGCH is unequal to "hold", one may compute the amplitude ratio $|\gamma_{E\text{-}RGCH}|/\gamma_{CPICH}$ and perform a long-term averaging to obtain a long term averaged $\lambda$. In case that E-RGCH is equal to "hold", the averaging is paused. This gated averaging generates a reliable estimate of the amplitude ratio λ, between non-"hold" (i.e., "up"/"down") E-RGCH and CPICH.

As such, the parameter $\tau_a$ can be defined as:

$$\tau_a = \lambda \cdot \gamma_{CPICH}/l. \quad (5)$$

The parameter l is a system parameter. The parameter l may be set to a fixed, predefined value such as 2 or any value close to 2. The parameter l may also be adjustable responsive to the prevailing conditions and requirements.

CPICH and E-RGCH will fade jointly and have a long-term constant amplitude ratio. Since CPICH is always present, the approach of the second variant will be very robust and always provide a good instantaneous E-RGCH reception.

The two variants for determining the parameter $\tau_a$ discussed above can be combined in various manners. If, for example, the prevailing conditions and requirements indicate that the first variant is more reliable, the second variant could be used as a fallback solution in case the first variant can temporarily not be practiced (e.g., due to DTX on E-HICH). In situations in which the second variant should be more reliable, the first variant could be used as a fallback solution in case the second variant can temporarily not be practiced or as long as no long-term average λ is available.

As has become apparent from the above embodiments, the present decoding technique for relative scheduling grants provides a plurality of advantages. For example, the reliability of (serving) E-RGCH detection can be drastically increased in case of good channel conditions. Moreover, even in the case of bad channel conditions the reliability is at least as good as conventional detection techniques. Another advantage is the fact that bad channel conditions or DTX on the (serving) E-HICH do not impair the detection reliability since a kind of automatic switch-off feature is provided that uses a predefined threshold value in such cases. Of course, this automatic switch-off feature can be activated and de-activated as required. Improvements can be achieved in situations with fading channel conditions, and especially in cases of slow-fading.

A further advantage is the fact that the technique proposed herein leads only to an insignificant increase of the transceiver complexity compared to existing solutions. In order to make maximum use of the advantages provided by the present technique, the network side and in particular the base station components may target at synchronising E-RGCH and E-HICH transmissions. In other words, the network can preferably send on E-RGCH when also the E-HICH is transmitted.

While the present invention has been described with respect to particular embodiments, including certain device arrangements and certain orders of steps within various methods, those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A method of controlling a wireless transceiver in a cellular communication system, the wireless transceiver listening to a scheduling channel configured to transport relative scheduling grants that signal adjustments in transmission resources granted to the wireless transceiver, the method comprising:
deriving an amplitude parameter indicative of an instantaneous amplitude level of the scheduling channel as received by the wireless transceiver when the scheduling channel is transmitted with a non-zero instantaneous amplitude level;
determining a threshold value taking into account the amplitude parameter;
processing a scheduling signal received over the scheduling channel to obtain a signal sample comprising a relative scheduling grant; and
subjecting the signal sample to a threshold decision based on the threshold value, to decode the relative scheduling grant.

2. The method of claim 1, wherein said deriving comprises deriving the amplitude parameter from a signal received over at least one further channel extending in parallel to the scheduling channel.

3. The method of claim 2, wherein the at least one further channel is an Automatic Repeat Request (ARQ) indicator channel, and wherein said deriving comprises deriving the amplitude parameter from an indicator signal received over the ARQ indicator channel.

4. The method of claim 3, wherein said determining comprises determining the threshold value $\tau_a$ as $$\tau_a = |\gamma_{E\text{-}HICH}|/k,$$

with $\gamma_{E\text{-}HICH}$ being a sample value indicative of an instantaneous amplitude level of the ARQ indicator channel and k being a system parameter.

5. The method claim 2, wherein the at least one further channel is a pilot channel, and wherein said deriving comprises deriving the amplitude parameter from a pilot signal received over the pilot channel.

6. The method of claim 5, wherein said determining comprises calculating the threshold value taking into account a long-term amplitude average λ of $|\gamma_{E\text{-}RGCH}|/\gamma_{CPICH}$, with $\gamma_{E\text{-}RGCH}$ and $\gamma_{CPICH} > 0$ being sample values indicative of an instantaneous amplitude level of the scheduling channel and the pilot channel, respectively, and wherein only sample values of $\gamma_{E\text{-}RGCH}$ not indicative of a "hold" are taken into account.

7. The method of claim 6, wherein said determining comprises determining the threshold value $\tau_a$ as $\tau_a = \lambda \cdot \gamma_{CPICH}/l$, with l being a system parameter.

8. The method of claim 6, wherein said deriving comprises deriving the amplitude parameter also from an indicator signal received over an Automatic Repeat Request (ARQ) indicator channel extending in parallel to the scheduling channel, and wherein a decision of whether or not a sample value of $\gamma_{E\text{-}RGCH}$ is indicative of a "hold" is at least initially based on the amplitude parameter derived from said indicator signal.

9. The method of claim 2, wherein either:
said deriving comprises determining an instantaneous amplitude level with which the wireless transceiver received the at least one further channel at a particular instant, and estimating that, if the scheduling channel was or had been transmitted with a non-zero instantaneous amplitude level, the wireless transceiver received or would have received the scheduling channel at the particular instant with approximately the same instantaneous amplitude level as that with which the transceiver received the at least one further channel; or
said determining comprises determining that, for each of multiple instants at which the wireless transceiver received the scheduling channel, the scheduling channel was transmitted with a non-zero instantaneous amplitude level, calculating an average over the multiple instants of a ratio between the instantaneous amplitude level with which the wireless transceiver received the scheduling channel and an instantaneous amplitude level with which the wireless transceiver received the at least one further channel, and determining the threshold value to use for performing the threshold decision on a signal sample received at a particular instant as a function of said average and an instantaneous amplitude level with which the wireless transceiver receives the at least one further channel at that particular instant.

10. The method of claim 1, further comprising:
comparing the determined threshold value with a predefined threshold value; and
if the determined threshold value does not exceed the predefined threshold value, performing the threshold decision based on the predefined threshold value.

11. The method of claim 1, further comprising:
processing a scheduling signal received over the scheduling channel to obtain another signal sample comprising another relative scheduling grant;
determining that, for decoding said another relative scheduling grant, an amplitude parameter indicative of an instantaneous amplitude level of the scheduling channel is either not available or not reliable; and
responsive to that determination, subjecting said another signal sample to a threshold decision based on a predefined threshold value.

12. The method of claim 1, wherein deriving an amplitude parameter and determining the threshold value are performed with a predefined periodicity.

13. The method of claim 12, wherein the scheduling channel is structured into radio frames comprising subframes, and wherein the periodicity is set to a value between a subframe duration and a radio frame duration.

14. The method of claim 1, comprising dynamically varying a quality with which the scheduling channel is decoded as instantaneous channel conditions change, by accounting for said amplitude parameter indicative of said instantaneous amplitude level in determining the threshold value.

15. The method of claim 1, wherein determining the threshold value comprises determining the threshold value without determining a noise variance of the scheduling channel.

16. The method of claim 1, wherein said subjecting comprises:
if the determined threshold value that takes into account the amplitude parameter exceeds a predefined threshold value that is based on a noise variance of the scheduling channel, performing the threshold decision based on the determined threshold value;
if the predefined threshold value that is based on the noise variance exceeds the determined threshold value that takes into account the amplitude parameter, performing the threshold decision based on the predefined threshold value.

17. A computer program product stored on a non-transitory computer readable medium and comprising program code portions that when executed on a computing device control a wireless transceiver in a cellular communication system, the wireless transceiver listening to a scheduling channel configured to transport relative scheduling grants that signal adjustments in transmission resources granted to the wireless transceiver, the program code portions controlling the wireless transceiver to:
derive an amplitude parameter indicative of an instantaneous amplitude level of the scheduling channel as received by the wireless transceiver when the scheduling channel is transmitted with a non-zero instantaneous amplitude level;
determine a threshold value taking into account the amplitude parameter;
process a scheduling signal received over the scheduling channel to obtain a signal sample comprising a relative scheduling grant; and
subject the signal sample to a threshold decision based on the threshold value to decode the relative scheduling grant.

18. A wireless transceiver configured to be controlled over a scheduling channel in a cellular communication system, the scheduling channel transporting relative scheduling grants that signal adjustments in transmission resources granted to the wireless transceiver, the wireless transceiver comprising:
a first processing circuit configured to derive an amplitude parameter indicative of an instantaneous amplitude level of the scheduling channel as received by the wireless transceiver when the scheduling channel is transmitted with a non-zero instantaneous amplitude level;
a second processing circuit configured to determine a threshold value taking into account the amplitude parameter;
a third processing circuit configured to process a scheduling signal received over the scheduling channel to obtain a signal sample comprising a relative scheduling grant; and
a fourth processing circuit configured to subject the signal sample to a threshold decision based on the threshold value, to decode the relative scheduling grant.

19. The wireless transceiver of claim 18, wherein the first processing circuit is configured to derive the amplitude parameter from a signal received over at least one further channel extending in parallel to the scheduling channel.

20. The wireless transceiver of claim 19, wherein the at least one further channel is an Automatic Repeat Request (ARQ) indicator channel, and wherein the first processing circuit is configured to derive the amplitude parameter from an indicator signal received over the ARQ indicator channel.

21. The wireless transceiver of claim 19, wherein the at least one further channel is a pilot channel, and wherein the first processing circuit is configured to derive the amplitude parameter from a pilot signal received over the pilot channel.

22. The wireless transceiver of claim 18, wherein the first processing circuit is configured to derive an amplitude parameter, and the second processing module is adapted to determine the threshold value, with a predefined periodicity.

23. The wireless transceiver of claim 18, wherein the scheduling channel is structured into radio frames comprising subframes, and wherein the periodicity is set to a value between a subframe duration and a radio frame duration.

* * * * *

UNITED STATES PATENT AND TRADEMARK OFFICE
CERTIFICATE OF CORRECTION

PATENT NO. : 9,025,472 B2
APPLICATION NO. : 12/994493
DATED : May 5, 2015
INVENTOR(S) : Eder et al.

Page 1 of 1

It is certified that error appears in the above-identified patent and that said Letters Patent is hereby corrected as shown below:

In the specification

In Column 3, Line 32, delete "(with $_{\gamma E\text{-}RGcH}$" and insert -- (with $_{\gamma E\text{-}RGCH}$ --, therefor.

In Column 8, Line 32, after Equation (4), insert -- . --.

In Column 8, Line 40, delete "$|_{\gamma E\text{-}HICH}$" and insert -- $|_{\gamma E\text{-}HICH}|$ --, therefor.

In Column 9, Line 2, delete "ratio λ," and insert -- ratio λ --, therefor.

Signed and Sealed this
Seventh Day of June, 2016

Michelle K. Lee
*Director of the United States Patent and Trademark Office*